US012163597B1

(12) United States Patent
Sweeney

(10) Patent No.: US 12,163,597 B1
(45) Date of Patent: Dec. 10, 2024

(54) SELF-LATCHING MANUAL RV GATE VALVE ACTUATOR

(71) Applicant: Kevin James Sweeney, Stafford, TX (US)

(72) Inventor: Kevin James Sweeney, Stafford, TX (US)

( * ) Notice: Subject to any disclaimer, the term of this patent is extended or adjusted under 35 U.S.C. 154(b) by 0 days.

(21) Appl. No.: 18/664,470

(22) Filed: May 15, 2024

(51) Int. Cl.
*F16K 3/02* (2006.01)
*F16K 31/46* (2006.01)
*F16K 31/524* (2006.01)
*F16K 31/60* (2006.01)
*B60R 15/00* (2006.01)

(52) U.S. Cl.
CPC .......... *F16K 3/0254* (2013.01); *F16K 31/465* (2013.01); *F16K 31/52475* (2013.01); *F16K 31/60* (2013.01); *B60R 15/00* (2013.01); *F16K 3/0218* (2013.01); *F16K 2200/30* (2021.08); *Y10T 137/6855* (2015.04)

(58) Field of Classification Search
CPC .... F16K 3/0254; F16K 3/0218; F16K 3/0281; F16K 3/312; F16K 31/465; F16K 31/46; F16K 31/523; F16K 31/52475; F16K 31/60; F16K 31/602; F16K 2200/30; F16K 35/022; B60R 15/00; Y10T 137/6855
USPC ........................................................ 251/231
See application file for complete search history.

(56) References Cited

U.S. PATENT DOCUMENTS

| 973,435 | A | * | 10/1910 | Hoyt | F16K 3/186 251/231 |
|---|---|---|---|---|---|
| 1,175,695 | A | | 3/1916 | Brand | |
| 2,885,174 | A | * | 5/1959 | Setka | F16K 31/52475 251/329 |
| 3,443,788 | A | | 5/1969 | Grove | |
| 4,007,911 | A | * | 2/1977 | Clarkson | F16K 3/312 251/231 |
| 4,026,517 | A | * | 5/1977 | Still | F16K 3/0254 251/231 |
| 4,483,509 | A | * | 11/1984 | Lewcock | F16K 3/184 251/231 |
| 4,875,504 | A | * | 10/1989 | Nicholson | F16K 31/046 251/291 |
| 5,078,180 | A | * | 1/1992 | Collins | B60R 15/00 251/30.05 |
| 5,439,198 | A | * | 8/1995 | Reed | F16K 3/0281 251/231 |
| 5,445,190 | A | * | 8/1995 | Gunder | F16K 3/0254 251/291 |
| 5,678,802 | A | * | 10/1997 | Lunder | F16K 31/465 251/294 |
| 5,938,174 | A | | 8/1999 | Gunder | |
| 6,364,286 | B1 | * | 4/2002 | Vegso | F16K 31/465 251/294 |

(Continued)

OTHER PUBLICATIONS

LaSalle Bristol, bristol Termination Valves; Jun. 19, 2023; pp. 2, 4; LaSalleBristol; United States (available at https://www.lasallebristol.com/download/bristol-termination-valve-catalog/).

*Primary Examiner* — David Colon-Morales

(57) ABSTRACT

An external actuator for manually operating a gate valve is described. The actuator includes a support plate, a linear sleeve, a shaft slidably arranged in the linear sleeve, a lever member, and a lever link. One end of the shaft is linked to a gate valve by way of a stem link, and a spring-loaded cam is provided on the support plate to releasably lock the shaft in a closed position.

20 Claims, 10 Drawing Sheets

(56) References Cited

U.S. PATENT DOCUMENTS

| | | | | |
|---|---|---|---|---|
| 6,408,886 B1* | 6/2002 | Milano, Jr. | ............. | B60R 15/00 |
| | | | | 251/291 |
| 6,962,322 B1* | 11/2005 | Zembillas | ............... | F16K 31/46 |
| | | | | 251/231 |
| 6,979,067 B2 | 12/2005 | Yang | | |
| 7,314,064 B2* | 1/2008 | Frias | ................... | F16K 3/0281 |
| | | | | 251/294 |
| 7,810,786 B2* | 10/2010 | Frias | ................... | F16K 3/0254 |
| | | | | 251/291 |
| 2022/0251888 A1 | 8/2022 | Scelzi | | |

* cited by examiner

SELF-LATCHING MANUAL RV GATE VALVE ACTUATOR

FIELD

This application relates to valve technology and, more specifically, gate valve actuator mechanisms for use in recreational vehicle sewage storage tanks.

BACKGROUND

The device disclosed herein pertains to a gate valve actuator that may be attached to a commercially available, or otherwise pre-existing, gate valve. In some embodiments, the gate valve (and the gate valve actuator attached thereto) may be configured to affix to a drainage line of a waste storage tank of a recreational vehicle ("RV") and control a flow of fluid therefrom.

In the RV-waste-disposal context, current gate valve designs often require a large amount of force to actuate, which can create frustrations for RV users. The large amount of force required to actuate current gate valve designs can be hard to control once the valves first begin to actuate-often leading to RV users inadvertently damaging their gate valves' components.

Gate valves on RVs are also often placed in hard-to-reach locations and typically comprise only a T-handle to assist users in actuating the valves. Because these T-handles move in only one linear direction (often coplanar with the stems to which they are attached), and because RV users frequently have difficulty in exerting enough leverage in that particular direction (due to the gate valves' hard-to-reach locations), this setup tends to lead to even more frustrations and difficulties for RV users.

Finally, when a gate valve is not overly difficult to actuate (as described above), said gate valve is in danger of being jarred open by the forces being imparted on the RV while traveling down the road. For these reasons, there is a need for an RV gate valve actuator that: (i) reduces the amount of force required from a user to actuate the gate valve; (ii) is configurable in a multitude of ways to provide the optimal geometry for users of the valve in hard-to-reach locations; and (iii) securely retains the valve in a closed position.

SUMMARY

An external actuator for manually operating a gate valve is described. The actuator includes a support plate with a first plurality of connection points. In some embodiments, at least one of the connection points is adapted to mount on a gate valve. In some embodiments, the gate valve includes a housing, a linearly sliding gate in the housing movable between an open and a closed position, an elongated valve stem attached to the linearly sliding gate, and a stroke length defined by a distance the gate travels between the open position and the closed position. The actuator includes a linear sleeve including a top face, a bottom face, two side faces, and an internal cross section. In some embodiments, the bottom face is attached to the support plate such that the sleeve is axially parallel to the valve stem of the gate valve when the support plate is mounted on the housing. In some embodiments, the top face is slotted. The actuator includes a shaft slidably arranged in the linear sleeve. In some embodiments, one end of the shaft is linked to the valve stem by way of a stem link. The actuator includes a lever member including a first end, a second end, and a plurality of connection points. In some embodiments, the first end is rotatably attached to the support plate via at least one of the first plurality of connection points. In some embodiments, the plane of rotation is parallel to the support plate. The actuator includes a lever link including a first end and a second end. In some embodiments, the first end of the lever link is rotatably connected to the lever member and the second end of the lever link is connected to the shaft by a pin through the slot on the sleeve.

In some embodiments, the apparatus is further adapted to releasably lock the gate valve in a closed position via a locking mechanism. In some embodiments, said linear sleeve further includes at least one aperture through at least one of the side faces, the shaft further includes at least one notch along its length, and the apparatus further includes a cam, with a protrusion, rotatably mounted to the support plate and a torsion spring disposed upon the support plate in engagement with the cam such that the protrusion of the cam is forced towards the at least one aperture on the linear sleeve. In some embodiments, the apparatus further includes a handle attached to the stem link. In some embodiments, the apparatus further includes a rod with a first end and a second end. In some embodiments, the first end of the rod is attached to the lever member and the second end of the rod is attached to a handle. In some embodiments, the first end of the rod is attached to the cam and the second end of the rod is attached to a handle. In some embodiments, the apparatus further includes a line with a first end and a second end. In some embodiments, the first end of the line is attached to the lever member and the second end of the line is attached to a handle. In some embodiments, the first end of the line is attached to the cam and the second end of the line is attached to a handle. In some embodiments, each connection point on the support plate has a corresponding connection point located across the center line of the support plate, allowing reversible configurations of the apparatus. In some embodiments, the apparatus further includes a handle removably mounted to one of a plurality of attachment locations on the lever member.

In another embodiment, a method of actuating a gate valve is disclosed. The method includes fixing a device to a gate valve. In some embodiments, the device includes a support plate, a linear sleeve, a shaft, a lever member, and a stem link. In some embodiments, the linear sleeve is connected to the support plate. In some embodiments, the shaft is configured to slide within the linear sleeve. In some embodiments, the shaft is connected to the lever member. In some embodiments, the shaft is connected to the stem link. The method includes attaching the stem link to a valve stem. In some embodiments, the valve stem is connected to the gate valve. The method includes actuating the gate valve by pulling the lever member. The method includes releasably locking the shaft in a position within the linear sleeve by a locking mechanism. In some embodiments, the lever member rotates on an axis parallel to the support plate.

DETAILED DESCRIPTION

Figure 1:
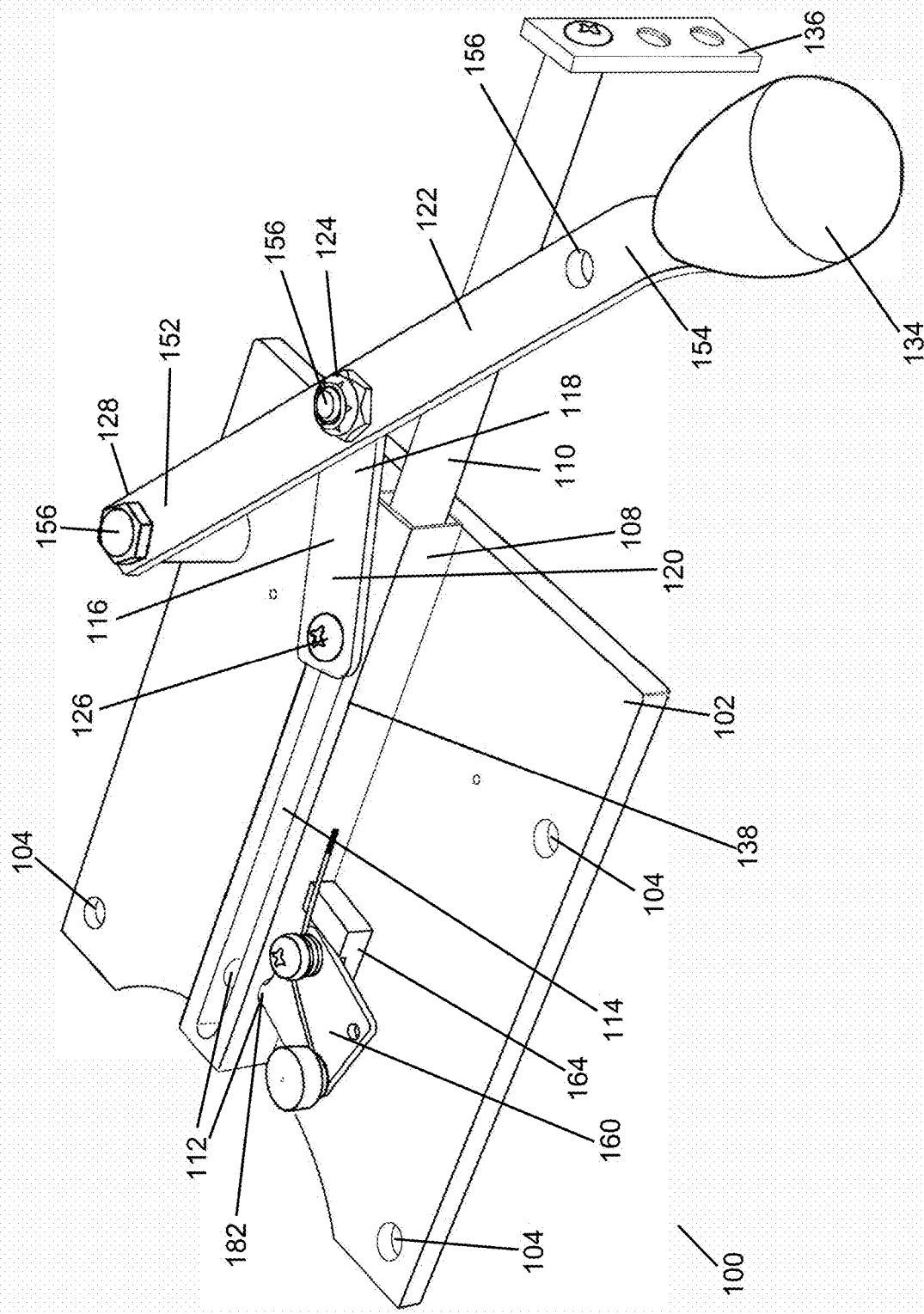
FIG. 1 depicts an embodiment of the self-latching manual RV gate valve actuator not attached to a gate valve, and in a fully open state.

Referring to FIG. 1, one embodiment of an external gate valve actuator 100 is depicted. External gate valve actuator 100 is configured to mount to a gate valve of an RV and assist in opening and closing the gate valve by providing a mechanical advantage. External gate valve actuator 100 may comprise support plate 102, linear sleeve 108, shaft 110, lever member 122, lever link 116, and stem link 136.

As depicted, support plate 102 is configured to attach to a gate valve assembly (not shown in FIG. 1) and provide a baseplate for various components of the external gate valve actuator 100. Support plate 102 includes connection points 104. In some embodiments, connection points 104 are adapted to mount onto a commercially available or otherwise preexisting gate valve. As shown in FIG. 1, support plate 102 includes four connection points 104. However, in other embodiments, support plate 102 may include more or fewer connection points 104, depending on the particular application. In some embodiments, each connection point 104 on support plate 102 has a corresponding connection point located across a center line of support plate 102, although such a symmetric disposition of connection points 104 is not required. A symmetric distribution of connection points 104 may permit a variety of reversible configurations, as demonstrated in FIG. 11 below. This symmetrical assembly allows a user to configure the external gate valve actuator 100 in a fashion that is most desirable for a user. For example, a user may mount the external gate valve actuator 100 facing outward from an RV to allow ease of access. In some embodiments, the placement and distribution of connection points 104 is dictated by the geometry of a pre-existing gate valve to permit external gate valve actuator 100 to be securely mated with the pre-existing gate valve. Connection points 104 may also be utilized to provide additional accessories, as described in further detail below, e.g., in FIG. 9.

In some embodiments, stem link 136 may provide an additional connection between external gate valve actuator 100 and the gate valve assembly by providing a linkage between an end of shaft 100 and the stem of the gate valve. Stem link 136 is typically comprised of a hard metal, such as stainless steel, although other materials may be used. In other embodiments, a traditional T-handle or other attachment may connect to stem link 136, as depicted in, e.g., FIG. 3 at 340. Actuating shaft 110 actuates the valve stem, which actuates the gate valve (not shown). Shaft 110 is configured to slide within linear sleeve 108 upon movement of the lever member 122 and lever link 116, as described herein. In some embodiments, face 138 of linear sleeve 108 includes slot 114. As described herein, lever link 116 is connected to shaft 110 through slot 114 by pin 126. Slot 114 is configured to limit the range of the sliding motion of shaft 110 by constraining the movement of the lever link-shaft connection at pin 126 so that shaft 110 remains in linear sleeve 108. In one embodiment, the travel of shaft 110 permitted by slot 114 and pin 126 corresponds to the travel of an attached gate valve.

Lever member 122 is configured to actuate a gate valve by moving lever link 116, thereby moving shaft 110 within linear sleeve 108. Lever member 122 includes first end 152, second end 154, and connection points 156. In some embodiments, first end 152 is rotatably attached to support plate 102 via at least one of the connection points 104. As shown in FIG. 1, the plane of rotation of lever member 122 is parallel to support plate 102.

As depicted in FIG. 1, external actuator 100 may be further adapted to releasably lock the gate valve in a closed position via a locking mechanism 160. In an alternative embodiment, locking mechanism 160 may be omitted, or alternative locking mechanisms may be utilized. As depicted, locking mechanism 160 is mounted to support plate 102. Spacer 164 is disposed between locking mechanism 160 and support plate 102.

In some embodiments, lever link 116 includes first end 118 and second end 120. First end 118 of lever link 116 is rotatably connected to lever member 122 and second end 120 of lever link 116 is rotatably connected to shaft 110 by pin 126 through slot 114 on linear sleeve 108. This assembly is configured to actuate a gate valve by connecting a valve stem of the gate valve to stem link 136 and sliding shaft 110 by actuating lever member 122. In some embodiments, linear sleeve 108 further includes at least one aperture 112 through at least one side face of linear sleeve 108 and shaft 110 further includes at least one notch along its length. Aperture 112 is configured to receive locking mechanism 160 to facilitate a connection between locking mechanism 160 and shaft 110, locking shaft 110 in place. A protrusion 182 on locking mechanism 160 is configured to lock shaft 110 in place by feeding through aperture 112 into a slot in shaft 110, as depicted in, e.g., FIG. 4 at 480. Actuating locking mechanism 160 unlocks shaft 110, allowing it to slide within linear sleeve 108. However, locking mechanism 160 is configured to automatically lock when the slot in shaft 110 aligns with locking mechanism 160. As depicted, locking mechanism 160 is spring-loaded to enable automatic engagement of protrusion 182 through aperture 112 into the slot in shaft 110.

Lever member 122 is connected to first end 118 of lever link 116 by fastener 124. According to some embodiments, one end of lever member 122 is fastened by pivot fastener 128 to support plate 102. In some embodiments, the external actuator 100 includes lever knob 134 removably mounted to one of a plurality of connection points 156 on second end 154 of lever member 122. In other embodiments, lever knob 134 is omitted. In other embodiments, external actuator 100 is further adapted to receive lever knob 134 in a plurality of configurations.

Support plate 102, linear sleeve 108, and shaft 110 may be comprised of polymers. In some embodiments, support plate 102 and linear sleeve 108 are comprised of a polymer which displays a density lower than metal, high toughness, resistance to cold temperatures, and a low friction coefficient such that shaft 110 may slide through linear sleeve 108 with less resistance, including acrylonitrile butadiene styrene (ABS). Shaft 110 may be comprised of a polymer which provides the requisite stiffness for a shaft 110 to slide through linear sleeve 108 and linearly move stem link 136. In some embodiments, shaft 110 is comprised of a polymer which displays high stiffness and a low friction coefficient, including polyoxymethylene. Support plate 102 may be rectangular. In some embodiments, support plate 102 is 0.233 inches thick.

Figure 2:
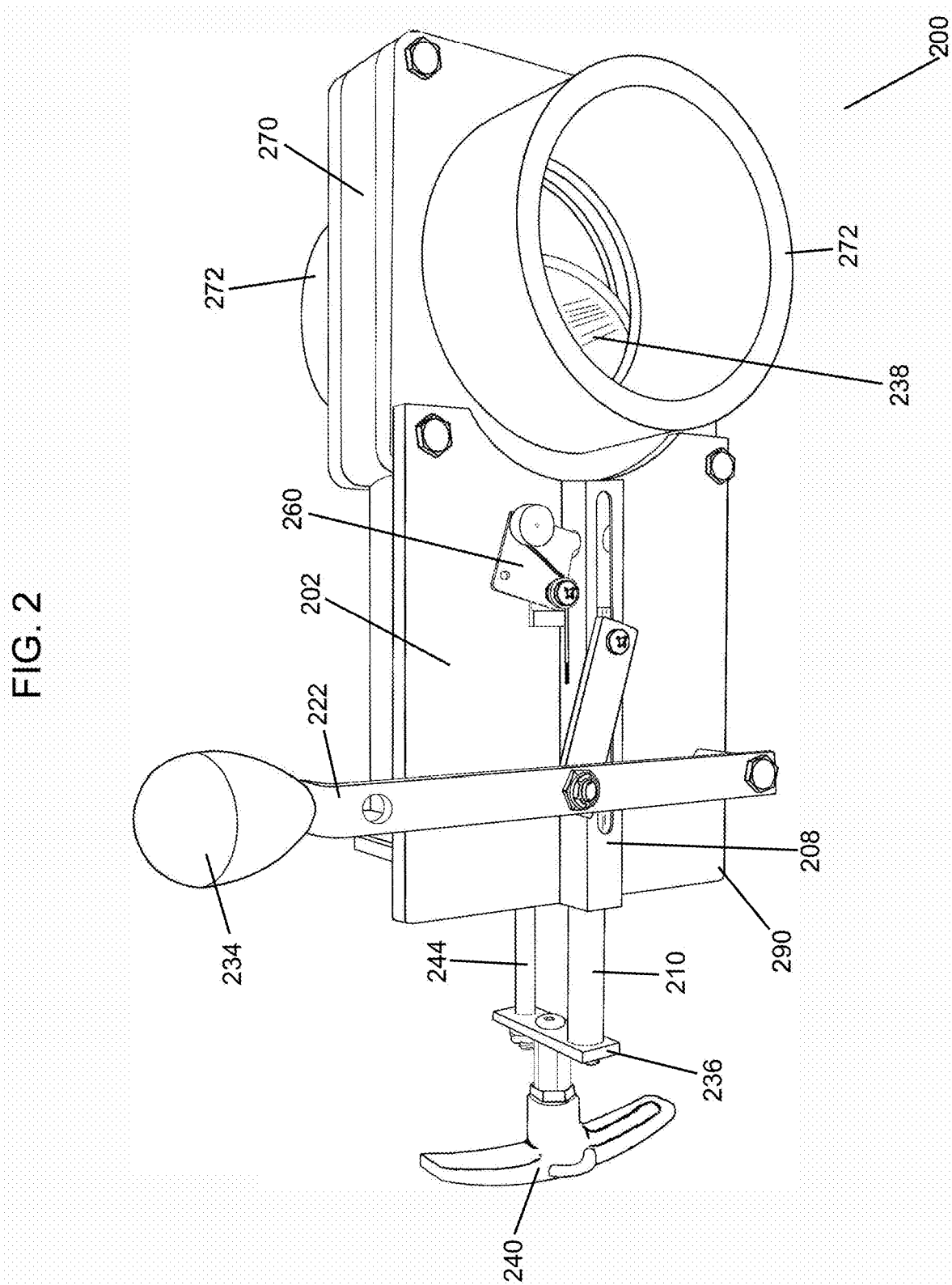
FIG. 2 is an embodiment of the self-latching manual RV gate valve actuator in a half-open state attached to a gate valve with flanges.

Referring to FIG. 2, gate valve system 200 shows an exemplary gate valve actuation mechanism (external actuator 290) attached to a commercially available 3" gate valve. Gate valve system 200 includes housing 270, linearly sliding gate 238 in housing 270 movable between an open and a closed position, valve stem 244 attached to linearly sliding gate 238, and a stroke length defined by a distance the gate travels between the open position and the closed position. Gate valve system 200 further includes lever member 222 and locking mechanism 260. Linear sleeve 208 is axially parallel to valve stem 244 of gate valve system 200 when support plate 202 is mounted on housing 270. As depicted in FIG. 2, external actuator 290 is adapted to mount to housing 270 and valve stem 244 of the gate valve and further adapted to actuate the valve stem 244 through a lever knob 234 attached to lever member 222. In some embodiments, as depicted in FIG. 2, external actuator 290 further comprises handle 240 attached to shaft 210 and valve stem 244 through stem link 236, providing a further means to actuate valve stem 244. In some embodiments, external actuator 290 is adapted to be assembled symmetrically about the axis of valve stem 244 to allow different orientations desired by a user to allow ease of access, for example. According to the embodiment depicted in FIG. 2, housing 270 includes symmetrical flanges 272. In some embodiments, flange 272 is a single piece. Valve stem 244 is coupled to stem link 236. Stem link 236 is further coupled to shaft 210. Shaft 210 is slidable within linear sleeve 208. As in FIG. 1, lever member 222 is configured to actuate, sliding shaft 210 within linear sleeve 208. When lever member 222 is actuated, shaft 210 and valve stem 244 move in unison. Valve stem 244 is connected to linearly sliding gate 238. Actuating lever member 222 actuates linearly sliding gate 238 via the connection between shaft 210 and valve stem 244 through stem link 236. In some embodiments, actuating handle 240 actuates linearly sliding gate 238 via the connection with valve stem 244 through stem link 236. Locking mechanism 260 can lock linearly sliding gate 238 in a position. Actuating locking mechanism 260 via a counter-clockwise rotation unlocks linearly sliding gate 238.

In some embodiments, linearly sliding gate 238 is a thin plastic plate that is configured to slide linearly back and forth between rubber seals of housing 270, with said rubber seals disposed on each side of linearly sliding gate 238. In some embodiments, valve stem 244 is a ¼ inch stainless steel rod. In some embodiments, valve stem 244 includes a threaded (¼-20) end. When linearly sliding gate 238 is open, waste flows by gravity from a waste storage tank through piping through housing 270 through another hose configured to connect to housing 270 and into a sewer system.

Figure 3:
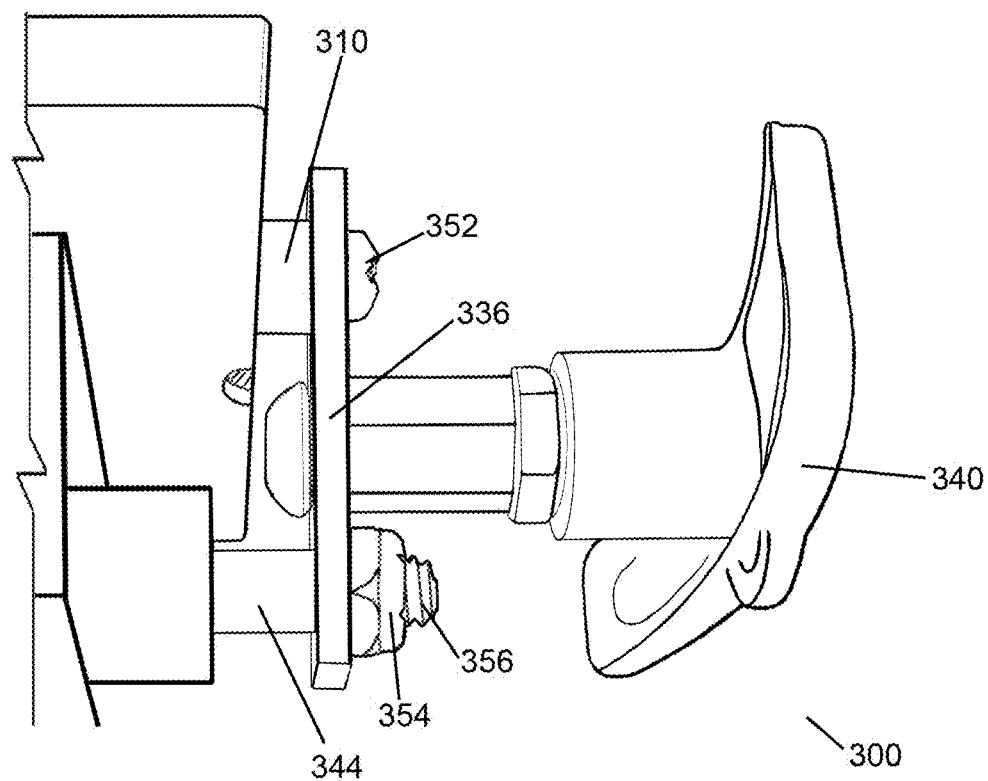
FIG. 3 is an enlarged partial perspective view depicting a portion of an embodiment of the self-latching manual RV gate valve actuator and the valve stem, showing the posterior face of the base and T-handle components.

FIG. 3 is an expanded view of stem link assembly 300. Stem link 336 is attached to shaft 310 on one end and valve stem 344 on another end. In some embodiments, stem link 336 is further attached to handle 340. Stem link 336 is a flat bracket with a first opening configured to receive the fastener 352 and a threaded opening to attach to threaded end of valve stem 344. Fastener 352 connects shaft 310 to stem link 336. Lock nut 354 threads onto the threaded end 356 of valve stem 344, further securing valve stem 344 to stem link 336. In some embodiments, lock nut 354 prevents valve stem 344 from loosening or becoming disconnected from stem link 336 due to external forces, including vibrations from the road during travel. When shaft 310 is actuated, valve stem 344 moves with it via stem link assembly 300. In some embodiments, pulling handle 340 will pull stem link assembly 300, including valve stem 344 and shaft 310.

Figure 4:
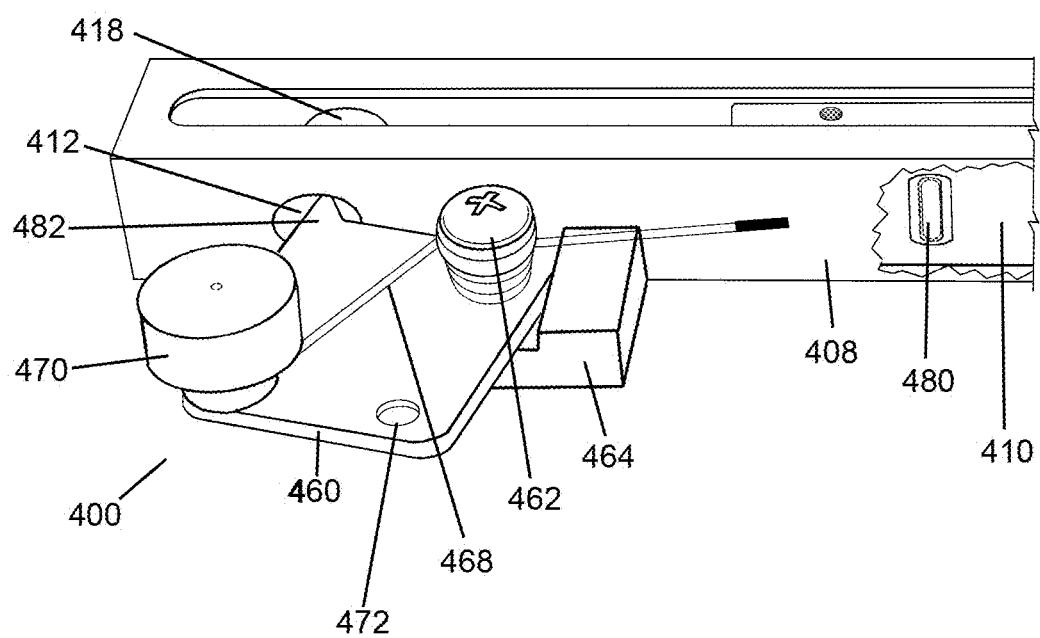
FIG. 4 is an enlarged view of the latching mechanism of an embodiment of the self-latching manual RV gate valve actuator.

FIG. 4 is an expanded view of locking mechanism 400, according to some embodiments. Locking mechanism 400 includes cam 460, with protrusion 482, rotatably mounted to support plate (not shown). Spacer 464 is disposed between cam 460 and support plate (not shown). Torsion spring 468 is disposed between linear sleeve 408 and knob 470 such that protrusion 482 of cam 460 is forced towards aperture 412 on linear sleeve 408 by torsion spring 468. Aperture 418 is a mirror of aperture 412 located on the opposite side of linear sleeve 408, allowing locking mechanism 400 to be mounted on the opposite side of the support plate in other embodiments. Slot 480 in shaft 410 is configured to receive protrusion 482 to lock shaft 410 in place. In some embodiments, cam 460 is a plate that is connected to knob 470 and torsion spring 468. Torsion spring 468 is wrapped around a spring fastener 462 connected to a support plate through cam 460 and spacer 464. Torsion spring 468 includes an extension disposed on knob 470. Torsion spring 468 includes another extension disposed on linear sleeve 408. Torsion spring 468 is configured to push protrusion 482 through aperture 412 into slot 480 when knob 470 is released. Knob 470 is configured to receive a finger of a user to actuate cam 460. Knob 470 is configured to be pulled by a user, pulling protrusion 482 through aperture 412. Actuating knob 470 further pulls protrusion 482 out of slot 480, allowing shaft 410 to actuate. Returning shaft 410 to its closed position actuates the cam 460 without requiring the user to actuate knob 470 by rotating protrusion 482 counterclockwise through aperture 412 until protrusion 482 aligns with slot 480. When protrusion 482 aligns with slot 480, torsion spring 468 pushes protrusion 482 back into engagement with slot 480 by providing tension against knob 470. This automatically locks shaft 410 and the gate of the valve in the closed position, as torsion spring 468 maintains protrusion 482 in engagement with slot 480 through aperture 412 until a user actuates knob 470. In other embodiments, locking mechanism 400 may be located on the other side of linear sleeve 408, and returning shaft 410 to its closed position rotates protrusion 482 clockwise through aperture 418 until protrusion 482 aligns with slot 480.

In some embodiments, locking mechanism 400 includes additional aperture 472 which may be used to connect alternative means for applying an unlocking force to locking mechanism 400. In some embodiments, additional aperture 472 may receive an actuatable extension rod to remotely actuate locking mechanism 400, such as described for FIG. 6. In some embodiments, additional aperture 472 may receive a line to remotely actuate locking mechanism 400, such as line 718 in FIG. 7. In other embodiments, an extension may connect additional aperture 472 to a lever member configured to provide a mechanical advantage for actuating locking mechanism 400, such as brake lever 970 in FIG. 9.

Figure 5:
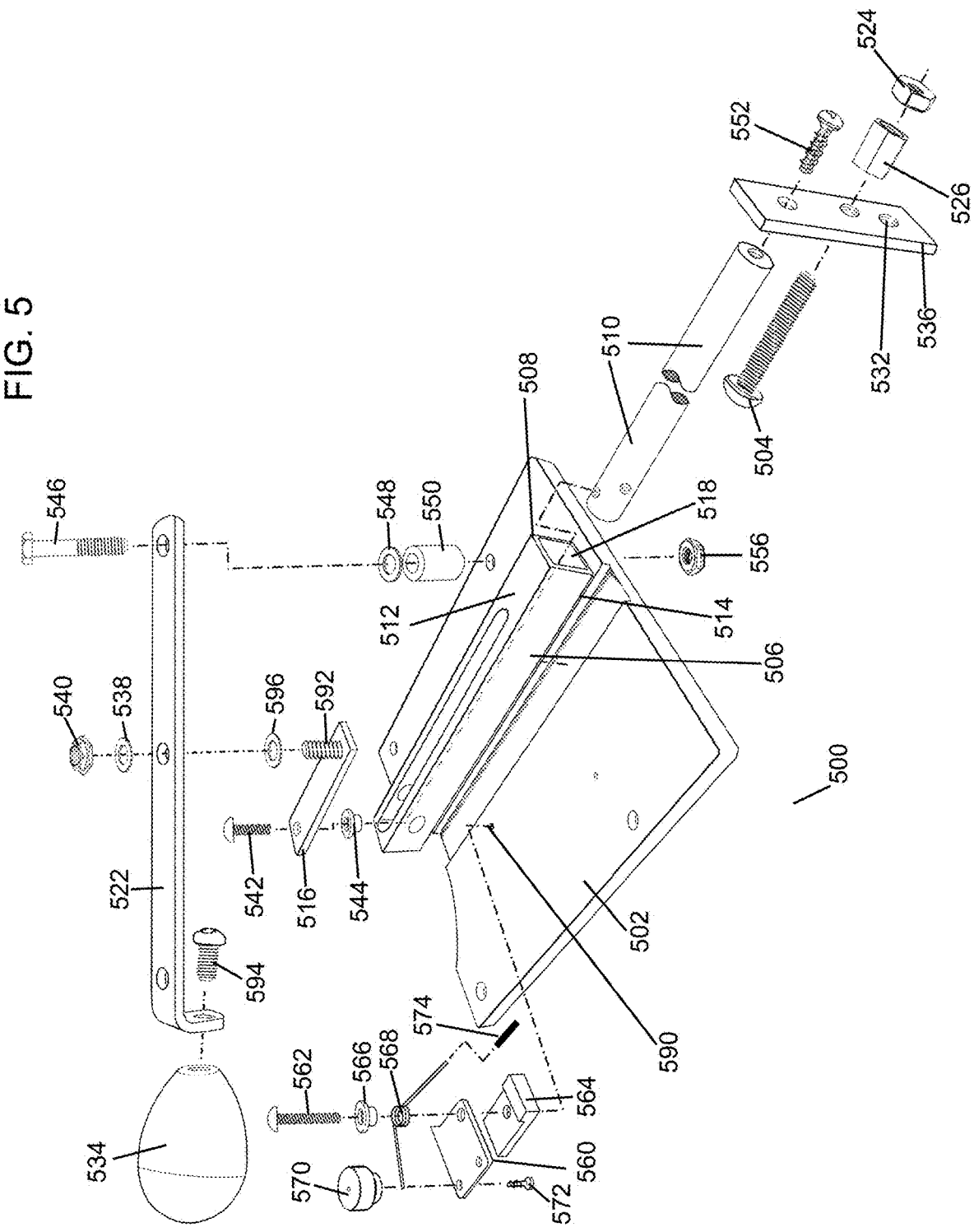
FIG. 5 is an exploded view of an embodiment of the self-latching manual RV gate valve actuator.

Referring to FIG. 5, an exploded view of actuator 500 is shown. Linear sleeve 508 includes top face 512, bottom face 514, side faces 506 and internal cross section 518. Bottom face 514 is attached to support plate 502. Shaft 510 is configured to fit into linear sleeve 508 and attach to stem link 536 by fastener 552. In some embodiments, fastener 552 is a threaded screw. In other embodiments, fastener 552 is a bolt or other means of fastening known to one of skill in the art. Stem link 536 is configured to connect to a valve stem of a gate valve by aperture 532. In some embodiments, aperture 532 is threaded ¼-20 to provide a secure connection with the threaded end of a valve stem. In some embodiments, a handle such as the original T-handle of the gate valve may be attached to stem link 536 by fastener 504. Like fastener 552, fastener 504 can be a threaded screw in some embodiments, or a bolt in other embodiments. In some embodiments, fastener 504 is further configured to pass through lock nut 524 and spacer 526 to attach the handle to stem link 536. Spacer 526 is a threaded plastic long nut, although other materials may be used. Fastener 504, spacer 526, and lock nut 524 allow the optional handle to be set to slightly rotate. Particularly with stubborn valves, a user may desire to attach the handle to stem link 536 to use a two-handed approach to opening the gate valve, which hallows the user to apply greater opening force to the valve with more control while avoiding excessive stress to the components of actuator 500. The optional handle further allows the user to slightly jostle the valve back and forth, which may be useful for loosening stubborn or stuck valves.

Lever member 522 is attached to shaft 510 by lever link 516. Lever link 516 includes threaded extension 592 configured to fasten to lever member 522 with washer 596, washer 538 and lock nut 540. Lever link 516 is attached to shaft 510 by pin 542 and spacer 544. Pin 542 is a bolt in some embodiments and a threaded screw in other embodiments. Lever member 522 is rotatably connected to the support plate 502 by fastener 546. Fastener 546 feeds through washer 548, extender 550 and support plate 502. Fastener 546 threads into lock nut 556 to secure lever member 522 to support plate 502. Lever member 522 is attached to lever knob 534 by fastener 594. Like the other fasteners in the present disclosure, fasteners 546 and 594 are bolts in some embodiments and threaded screws in other embodiments.

Cam 560 is connected to support plate 502 by fastener 562. Spacer 564 is disposed between cam 560 and support plate 502. Spring spacer 566 is threaded through fastener 562. The center of torsion spring 568 is disposed through spring spacer 566. Knob 570 is connected to cam 560 by fastener 572. Fasteners 562 and 572 are bolts in some embodiments and threaded screws in other embodiments. Cam 560, torsion spring 568, knob 570, and their respective fasteners and spacers comprise a locking mechanism configured to lock shaft 510 in place. The locking mechanism is configured to attach to support plate 502 at attachment point 590. In some embodiments, the spacers and washers may be comprised of a material such as ABS or nylon. In some embodiments, heat shrink tube 574 (or other similar material) is disposed around the leg of torsion spring 568 to prevent marring of the linear sleeve 508 during operation of the locking mechanism.

Figure 6:
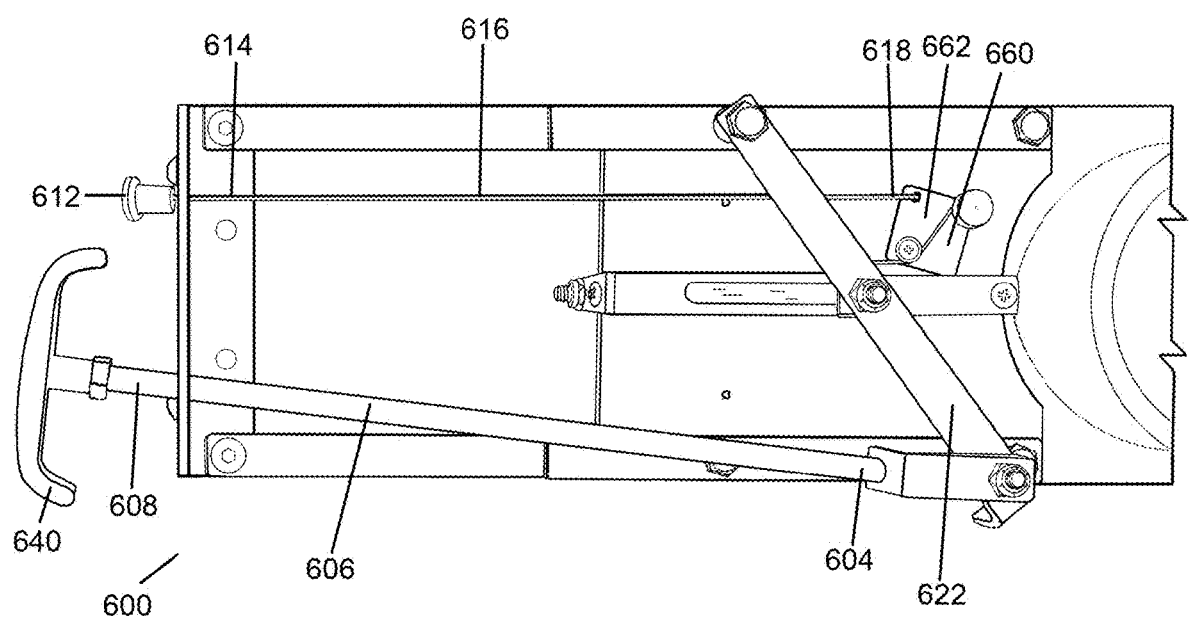
FIG. 6 depicts an embodiment of the self-latching manual RV gate valve actuator attached to a valve and fitted with extension rods attached to the lever and locking mechanism.

FIG. 6 is an embodiment of the gate valve actuator with alternative actuation mechanisms. External actuator 600 includes a rod 606 with first end 604 and second end 608. First end 604 of rod 606 is attached to lever member 622 and second end 608 of rod 606 is attached to handle 640. External actuator 600 includes cam release rod 616 with first end 618 and second end 614. First end 618 is attached to cam 662 of locking mechanism 660 and second end 614 of cam release rod 616 is attached to handle 612. External actuator 600 is adapted to actuate the gate valve by pulling rod 606 attached to lever member 622, like in FIGS. 1 and 2. In some embodiments, the external actuator 600 is adapted to linearly actuate the gate valve by rod 606 in line with the direction of the actuation of the gate valve. Locking mechanism 660 is configured to automatically lock external actuator 600. External actuator 600 is further adapted to unlock the gate valve by pulling cam release rod 616 attached to locking mechanism 660. Pulling handle 640 can actuate a gate valve attached to external actuator 600. Pulling handle 612 unlocks locking mechanism 660, like pulling the knob 470 in FIG. 4.

Figure 7:
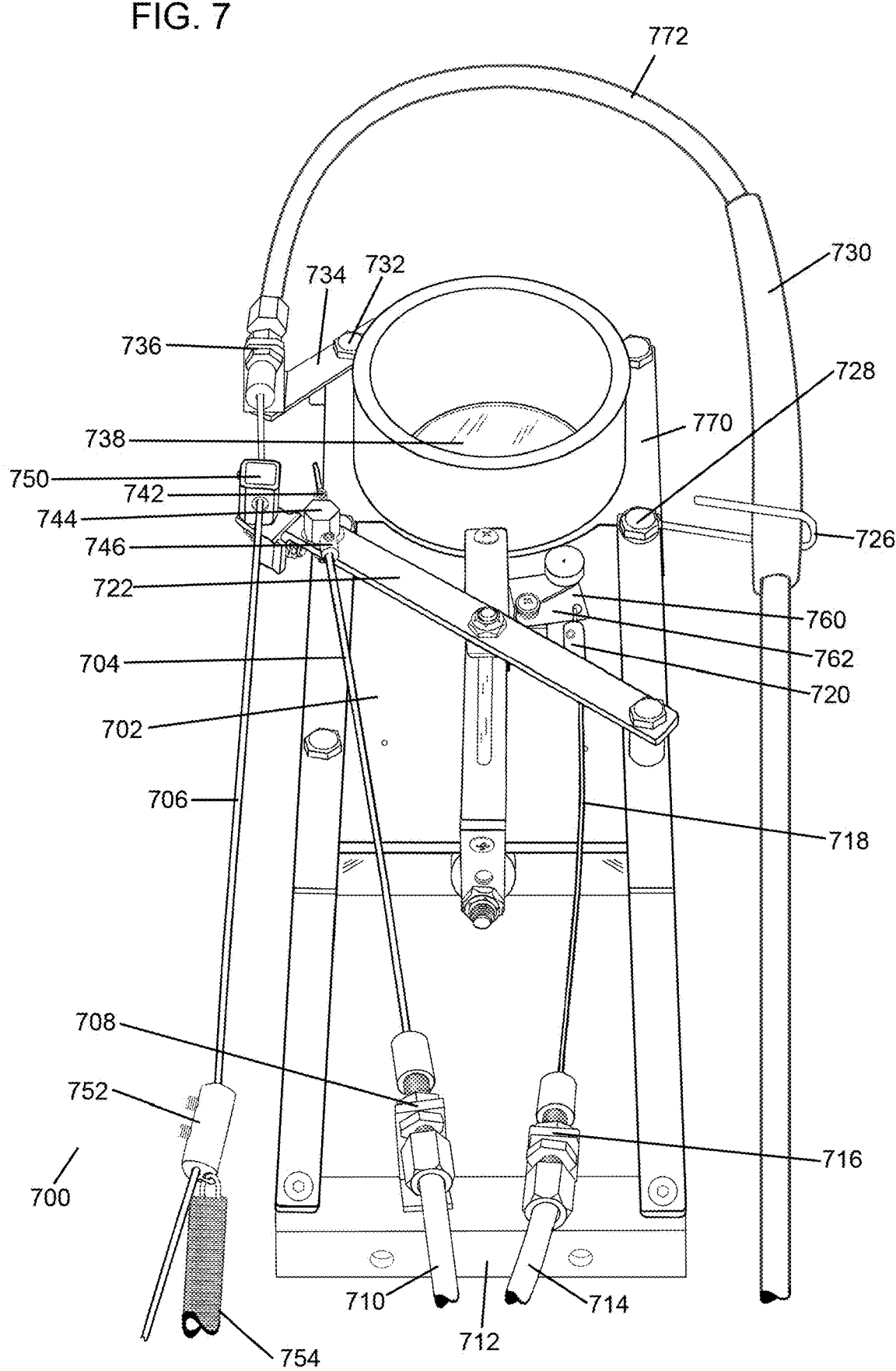
FIG. 7 depicts another embodiment of the self-latching manual RV gate valve actuator with mechanical control cables, according to one aspect of the invention.

FIG. 7 is an embodiment of the gate valve actuator with further alternative actuation mechanisms. External actuator 700 includes line 704 attached to lever member 722 by cable connector 744. Cable stop 742 configures line 704 to open gate valve 738. Cable stop 746 configures line 704 to close gate valve 738. External actuator 700 is adapted to actuate gate valve 738 by pulling and/or pushing line 704 attached to lever member 722. External actuator 700 includes line 718 attached to cam 762 by cable connector 720. External actuator 700 is further adapted to unlock gate valve 738 by pulling line 718 attached to cam 762 of the locking mechanism 760. Lines 704 and 718 are connected to bracket 712 by cable connectors 708 and 716, respectively. Lines 704 and 718 extend through cable connectors 708 and 716 into cable sleeves 710 and 714, respectively. Cable 706 is connected to lever member 722 by cable guide 750. Cable 706 is connected to bracket 734 by cable connector 736. Bracket 734 is connected to flange 770 at connection point 732, thereby secured to the body of gate valve 738. Cable 706 extends through cable connector 736 into conduit 772. Cable 706 within conduit 772 wraps around gate valve 738 and terminates by connecting to a T-handle (not shown). When lever member 722 is in the open position, pulling the T-handle (not shown) connected to the end of cable 706 brings cable stop 752 into contact with cable guide 750, thereby returning lever member 722 into its closed position and extending return spring 754 with continued pulling. When cable 706 is released, return spring 754 contracts, thereby returning cable stop 752 to its original position. Optional cable guide hook 726, mounted to support plate 702 and valve housing 770 via connection point 728, maintains cable 706 in position close to external actuator 700. In some embodiments, an optional sleeve 730 may provide conduit 772 with chafe protection from cable guide 726. Sleeve 730 may be formed of any suitable material such as a section of vinyl, rubber, or nylon tubing, or other materials.

In some embodiments, actuating gate valve 738 comprises opening and closing it. Pulling and/or pushing cable 704 actuates gate valve 738. In some embodiments, cable 706 may be pulled in conjunction with pushing cable 704 to provide greater mechanical advantage to the user while closing gate valve 738. The cable configuration allows users to open and close the gate valve by pulling on cables instead of levers. Lever member 722 is like lever member 122—it actuates gate valve 738 by actuating a shaft connected to a stem link. This stem link is connected to a valve stem, which is connected to gate valve 738. Actuating lever member 722 actuates the valve stem, which actuates gate valve 738 in turn. Pulling cable 718 actuates locking mechanism 760 which unlocks a shaft as described in the description of FIG. 4.

The embodiment depicted in FIG. 7 provides one possible configuration of the described alternative actuation mechanism, and there may be many alterations made to the depicted embodiment without departing from the teachings of FIG. 7. For example, the cable configuration depicted in FIG. 7 can be reversed, such as to accommodate alternative configurations of the lever member 722 and locking mechanism 760. As another example, cable mounting may be achieved in a different manner to accommodate the circumstances of the mounting location, such as mounting the cables without the use of bracket 712, cable stops 708 and 716, and/or cable guide hook 726. Furthermore, the remote actuation capability of the depicted cables would allow alteration of the cable paths to circumvent a variety of obstructions and accommodate numerous valve locations, greatly enhancing the number of ways that any RV gate valve can be fitted with a gate valve actuator.

Figure 8:
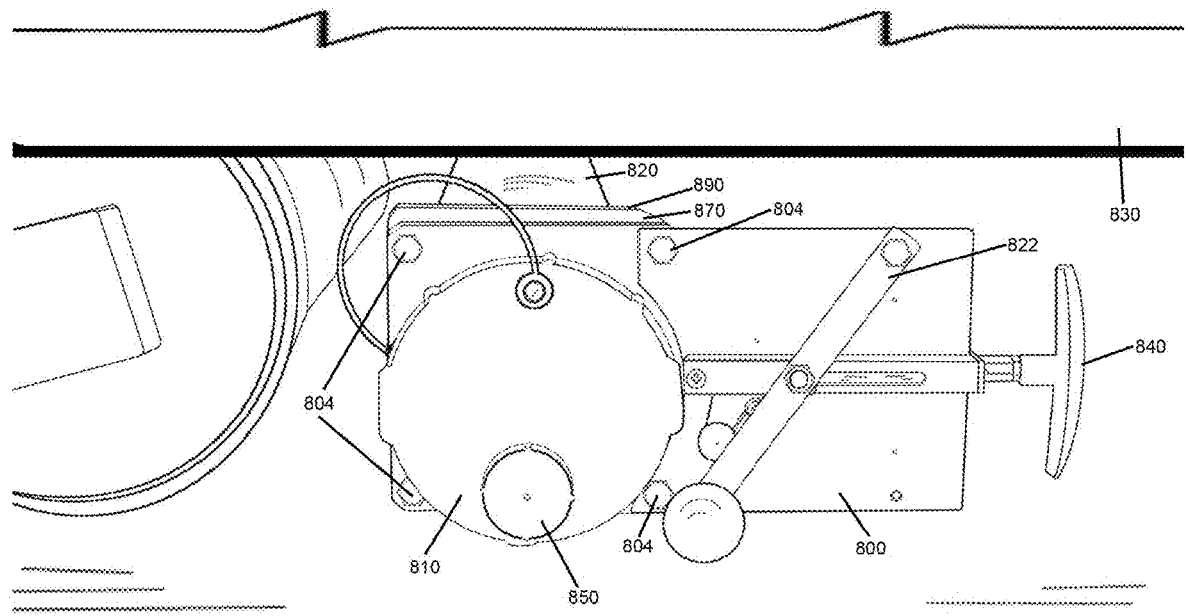
FIG. 8 depicts an embodiment of the self-latching manual RV gate valve actuator connected to an RV.

FIG. 8 shows gate valve actuator 800 attached to recreational vehicle (RV) 830. Gate valve actuator 800 is disposed under RV 830 in this embodiment. Gate valve actuator 800 includes removable cover 810 that encases the gate valve of gate valve actuator 800. Actuating lever member 822 actuates the gate valve of gate valve actuator 800. In some embodiments, gate valve actuator 800 further comprises a handle 840, which actuates the gate valve of gate valve actuator 800 when pulled and/or pushed. In some embodiments, removable cover 810 is provided to prevent leakage or drainage from the gate valve during travel. Removable cover 810 can be removed for connection of a sewer hose to gate valve actuator 800. In other embodiments, removable cover 810 is further configured to connect to a conventional garden hose with removal of pipe cap 850 for tank and system rinsing. Flange 890 of pipe 820 is connected to the gate valve housing 870 and the gate valve actuator 800 at connection points 804. In some embodiments, pipe 820 runs underneath RV 830 and gate valve actuator 800 is also connected underneath RV 830 to receive pipe 820 accordingly. As described for FIG. 2, waste and/or other liquid flows through pipe 820, through gate valve actuator 800, then through a hose into a sewer system. FIG. 8 shows one possible configuration of gate valve actuator 800. In other embodiments, the gate valve actuator 800 may be used in other configurations, such as the configuration shown in FIG. 10.

Figure 9:
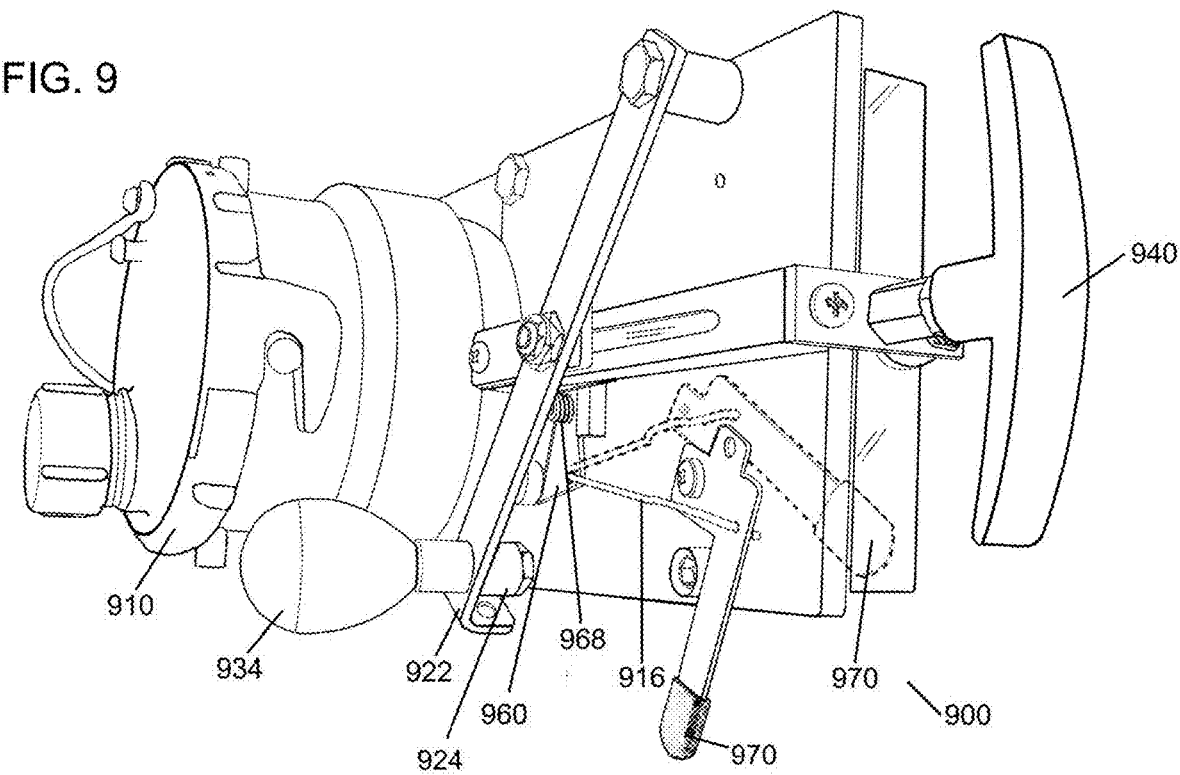
FIG. 9 depicts an embodiment of the self-latching manual RV gate valve actuator connected to a gate valve that includes a housing.

FIG. 9 shows gate valve actuator 900 connected to a gate valve with removable cover 910. Like removable cover 810, removable cover 910 prevents leakage from the gate valve during travel and is removable to facilitate drainage from the gate valve. Lever member 922 actuates the gate valve. Lever knob 934 is connected to lever member 922 and is configured to be grabbed and pushed/pulled by a user to move lever member 922 and actuate the gate valve. As depicted, handle 940 is also configured to be grabbed and pushed/pulled by a user to actuate the gate valve, although in some embodiments handle 940 may be omitted. Locking mechanism 960 locks the gate valve in its current position. Brake lever 970 is connected to locking mechanism 960 by extension 916. In some embodiments, lever 970 is configured to unlock the gate valve by actuating brake lever 970. As shown, brake lever 970 and locking mechanism 960 are located on the same side of gate valve actuator 900 as lever member 922. In such embodiments, actuating lever member 922 to open the gate valve brings extension 924 into contact with brake lever 970, thereby returning brake lever 970 to its original (lock-enabled) position such that locking mechanism 960 automatically relocks gate valve actuator 900 via torsion spring 968 when lever member 922 is returned to its original position, as described for FIG. 4.

Figure 10:
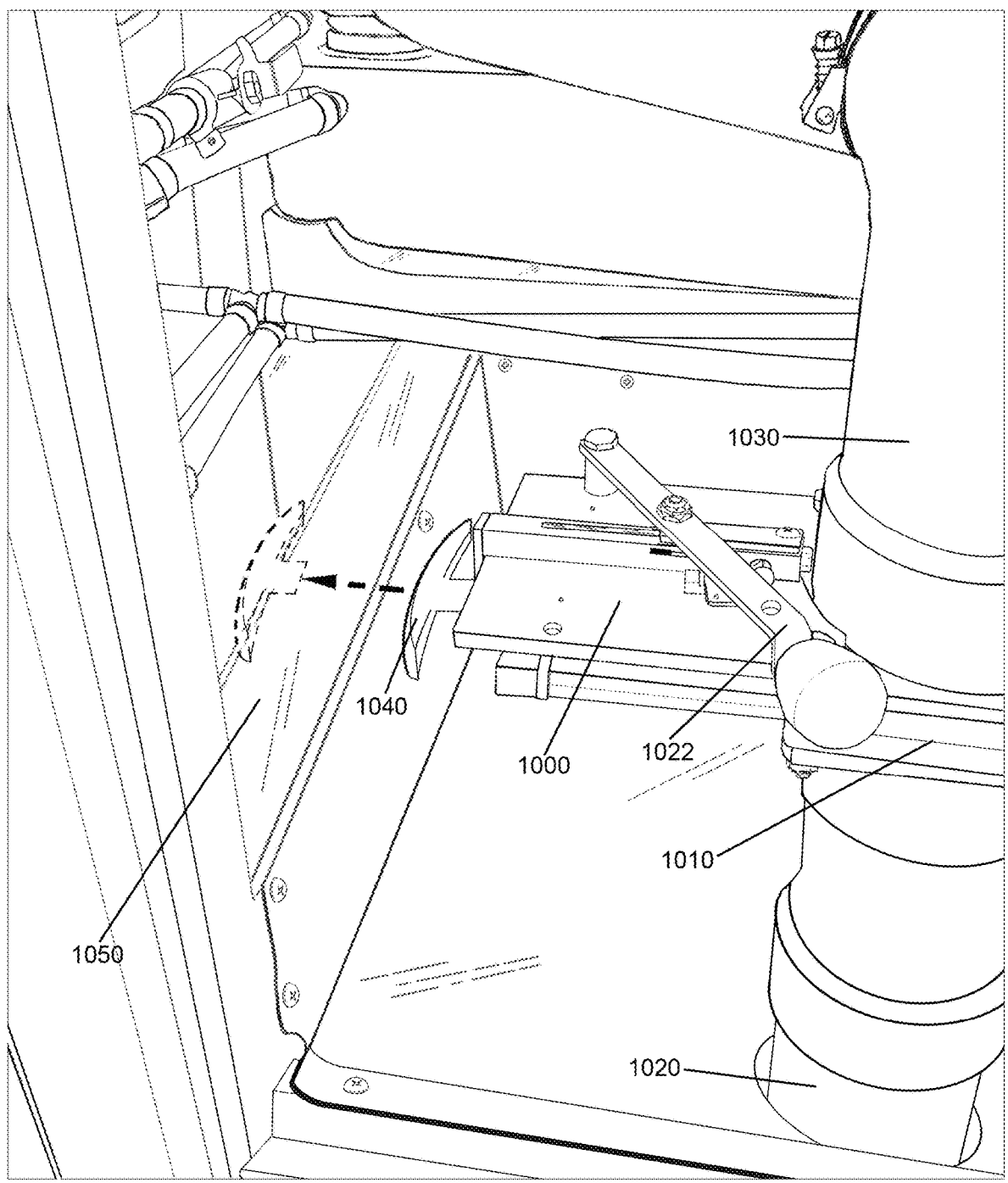
FIG. 10 depicts an embodiment of the self-latching manual RV gate valve actuator connected to a gate valve in a compartment of a recreational vehicle.

FIG. 10 shows gate valve actuator 1000 connected to pipes 1020 and 1030 within a compartment of a recreational vehicle (RV). FIG. 10 demonstrates wall 1050 of the RV, the location of which illustrates the undesirability of relying solely on the awkwardly-placed handle 1040 for actuation of the gate valve, as in conventional RV gate valves. This demonstrates the utility of gate valve actuator 1000, which provides an alternative gate valve actuation means with lever member 1022. In locations with different space limitations, gate valve actuator 1000 can be orientated differently by securing the gate valve actuator 1000 to any two connection points of the flanges around gate valve 1010, provided the user is able, if required, to similarly rotate the gate valve such that the valve stem is in line with the desired position of the gate valve actuator 1000.

Figure 11A:
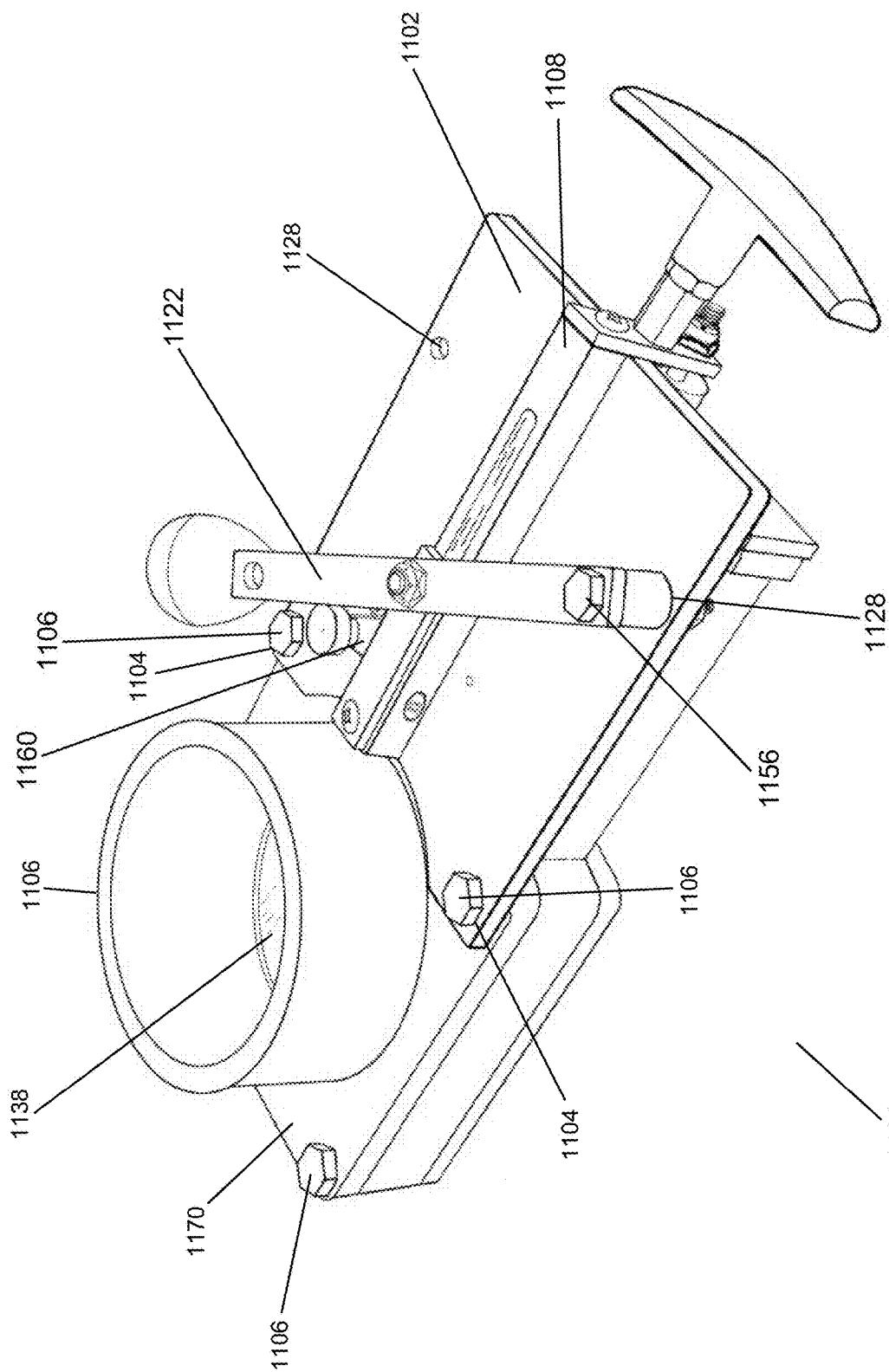
FIGS. 11A and 11B depict alternative embodiments of the self-latching manual RV gate valve actuator connected reversibly to gate valves of different sizes.
Figure 11B:
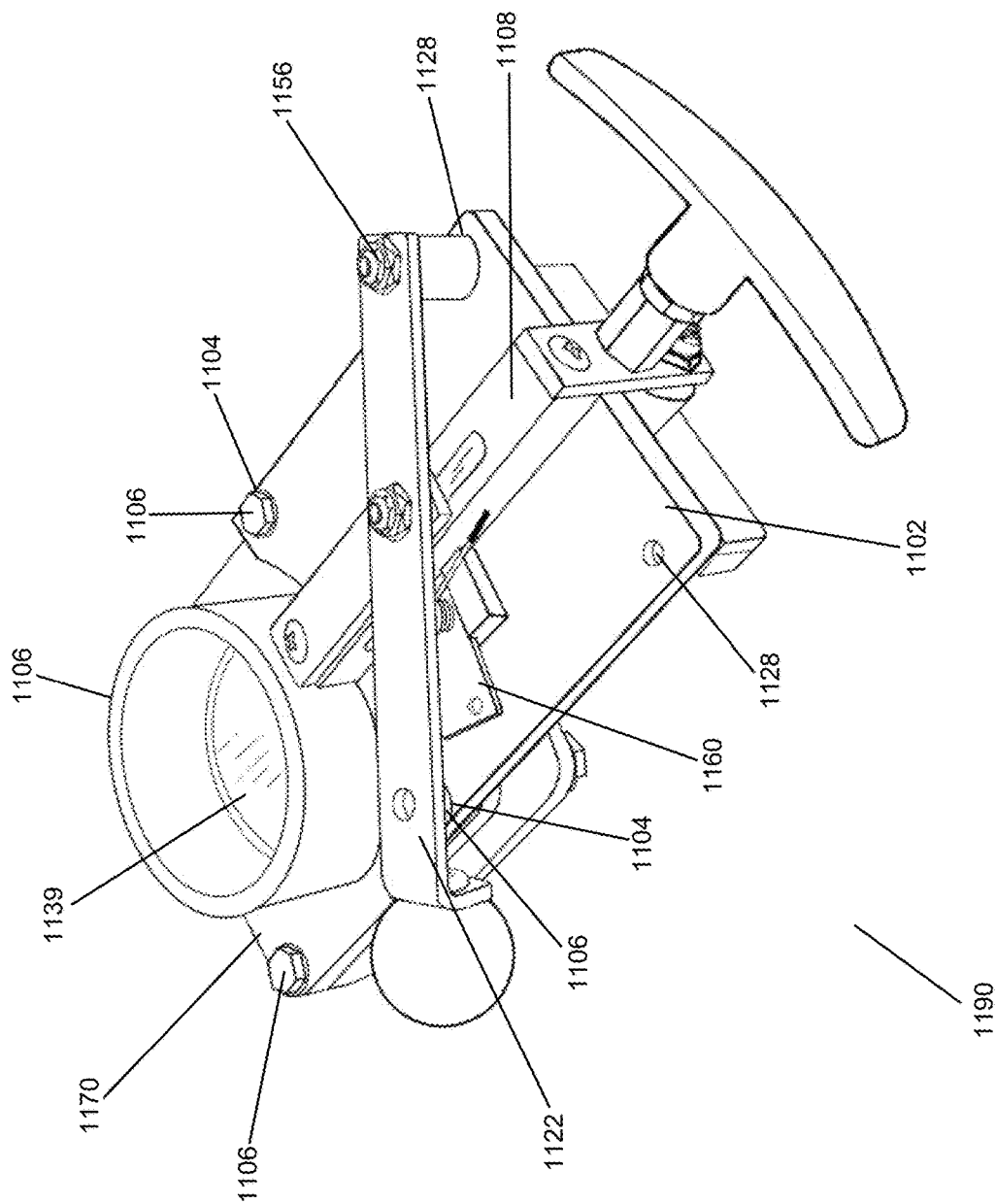

As depicted in exemplary embodiments in FIGS. 11A and 11B, the self-latching manual RV gate valve actuator 1100 can be scaled up or down for other valve sizes, such as gate valve actuator 1190. Typically, solid and liquid waste in combination (black water) is drained through three-inch valves, such as gate valve 1138. While some recreational vehicles may use separate three-inch valves for liquid waste (grey water) drainage as well, the grey water valves can be 1.5-2.0 inches wide, such as gate valve 1139 (not to scale). However, the concepts introduced in this specification may be applicable to gate valves of various sizes. Furthermore, as depicted in FIGS. 11A and 11B, the self-latching manual RV gate valve actuator 1100 can be positioned reversibly in a variety of configurations, such as the configuration of gate valve actuator 1190. For example, connection points 1106 allow support plate 1102 to be secured to gate valves 1138 and 1139 in a plurality of configurations to adapt to the specific geometry of the workspace, such as obstructions created by the RV body, so long as gate valves 1138 and 1139 are able to be oriented such that the valve stems are in line with the gate valve actuators 1100 and 1190. As another example, lever member 1122 may be installed reversibly around linear sleeve 1108 by securing lever member fastener 1156 to any one of the connection points 1128. As another example, locking mechanism 1160 may also be installed reversibly around linear sleeve 1108. Any gate valve can be fitted with a self-latching manual RV gate valve actuator where needed due to awkward positioning of valves, arthritis issues, etc., for all valve sizes.

References to specific materials such as stainless steel, nylon, ABS, polyoxymethylene, etc. in the embodiments described above should not be construed to exclude other possible materials which will be apparent to one of skill in the art.

It will be apparent to one of ordinary skill in the art that the gate valve actuator of the invention may be provided using some or all of the mentioned features and components without departing from the spirit and scope of the present invention. It will also be apparent to one of ordinary skill in the art that the embodiments described above are specific examples of a single broader invention which may have greater scope than any of the singular descriptions taught. There may be many alterations made in the descriptions without departing from the spirit and scope of the present invention.

What is claimed is:

1. An external actuator for manually operating a gate valve, comprising:
   a support plate with a first plurality of connection points, wherein at least one of the connection points is adapted to mount on the gate valve,
   wherein the gate valve comprises a housing, a linearly sliding gate in the housing movable between an open and a closed position, an elongated valve stem attached to the linearly sliding gate, and a stroke length defined by a distance the gate travels between the open position and the closed position;

a linear sleeve comprising a top face, a bottom face, and two side faces, wherein the bottom face is attached to the support plate such that the linear sleeve is axially parallel to the valve stem of the gate valve when the support plate is mounted on the housing, wherein the top face is slotted;

a shaft slidably arranged in the linear sleeve, wherein one end of the shaft is linked to the valve stem by way of a stem link;

a lever member comprising a first end, a second end, and a second plurality of connection points wherein the first end is rotatably attached to the support plate, wherein the plane of rotation is parallel to the support plate; and a lever link comprising a first end and a second end, wherein the first end of the lever link is rotatably connected to the lever member and the second end of the lever link is rotatably connected to the shaft by a pin through a slot on the linear sleeve.

2. The external actuator of claim 1, further comprising a handle attached to the stem link.

3. The external actuator of claim 1, further comprising a rod with a first end and a second end, wherein the first end of the rod is attached to the lever member and the second end of the rod is attached to a handle, wherein the rod is adapted to allow remote actuation of the lever member.

4. The external actuator of claim 1, further comprising a line attached to the lever member and adapted to allow remote actuation of the lever member.

5. The external actuator of claim 1, wherein said linear sleeve further comprises at least one aperture through at least one of the side faces, the shaft further comprises at least one notch along its length, and the external actuator further comprises:

a cam, with a protrusion, rotatably mounted to the support plate; and a torsion spring disposed such that the protrusion of the cam is forced towards the at least one aperture on the linear sleeve, wherein, when the linearly sliding gate of the gate valve is in its closed position, the protrusion of the cam is forced into the at least one notch of the shaft and prevents movement of the shaft until the cam is rotated and the protrusion is extracted from the at least one notch of the shaft.

6. The external actuator of claim 5, further comprising a rod with a first end and a second end, wherein the first end is attached to the cam and the second end of the rod is attached to a handle, wherein applying a force on the handle away from the cam imparts a rotation force on the cam to extract the protrusion of the cam from the at least one aperture.

7. The external actuator of claim 5, further comprising a line attached to the cam, wherein applying a force on the line away from the cam imparts a rotation force on the cam to extract the protrusion of the cam from the at least one aperture.

8. The external actuator of claim 5, further comprising a brake lever rotatably mounted to the support plate, wherein the brake lever is further connected to the cam via an extension pin, the brake lever having an engaged position and a disengaged position, wherein, when the brake lever is in a disengaged position, actuating the lever member from a closed position to an open position pushes the brake lever to the engaged position.

9. The external actuator of claim 5, further comprising:

a first cable attached to the second end of the lever member, wherein the first cable is adapted to actuate the gate valve by rotating the lever member from its closed position to its open position;

a second cable attached to the second end of the lever member by a cable guide, wherein the second cable comprises a cable path around the valve housing, wherein the first end of the cable path terminates in a cable stop attached to a tension spring and the second end of the cable path terminates in a handle, wherein the handle is adapted to draw the cable stop into contact with the cable guide and return the lever member to its closed position while extending the tension spring, and the handle is further adapted to allow the tension spring to contract upon release of the handle, thereby returning the cable stop to its original position; and a third cable attached to the cam, wherein the third cable is adapted to rotate the cam to extract the protrusion from the at least one aperture on the linear sleeve.

10. The external actuator of claim 9, wherein the first cable attached to the second end of the lever member comprises a push-pull cable, wherein pushing the first cable actuates the gate valve by rotating the lever member from its open position to its closed position.

11. An actuator for manually operating a gate valve, the actuator comprising:

a support plate, wherein at least a portion of the support plate is adapted to mount on a gate valve housing;

a slotted linear sleeve disposed on the support plate;

a shaft slidably arranged in the linear sleeve, wherein one end of the shaft comprises a stem link;

a lever member comprising a first end and a second end, wherein the first end of the lever member is rotatably attached to the support plate such that the plane of rotation of the lever member is parallel to the support plate; and a lever link comprising a first end and a second end, wherein the first end of the lever link is rotatably connected to the lever member and the second end of the lever link is rotatably connected to the shaft through a slot of the linear sleeve.

12. The actuator of claim 11, the actuator further comprising:

a cam, with a protrusion, rotatably mounted to the support plate;

at least one aperture through a portion of the slotted linear sleeve;

at least one notch along the length of the shaft; and a torsion spring comprising at least one arm in engagement with the cam, such that the at least one arm of the torsion spring forces the cam towards the at least one aperture of the slotted linear sleeve, wherein the protrusion of the cam is forced through the at least one aperture of the slotted linear sleeve and, when the shaft is in a closed position, into the at least one notch of the shaft.

13. The actuator of claim 12, further comprising a brake lever rotatably mounted to the support plate, wherein the brake lever is further connected to the cam, the brake lever having an engaged position and a disengaged position, wherein, when the brake lever is in the disengaged position, actuating the lever member from a closed position to an open position pushes the brake lever to the engaged position.

14. A method of actuating a gate valve, comprising:
fixing a device to a gate valve assembly, wherein the device comprises a support plate, a linear sleeve, a shaft, a lever member, and a stem link;
   wherein the linear sleeve is connected to the support plate;
   wherein the shaft is configured to slide within the linear sleeve;
   wherein the shaft is connected to the lever member;
   wherein the shaft is connected to the stem link;
attaching the stem link to a valve stem, wherein the valve stem is connected to the gate valve; and
actuating the gate valve by rotating the lever member.

15. The method of claim 14, wherein the lever member rotates on an axis parallel to the support plate.

16. The method of claim 14, wherein the lever member is actuated remotely by pulling an extension rod connected to the lever member.

17. The method of claim 14, wherein the lever member is actuated remotely by imparting a force on a line connected to the lever member.

18. The method of claim 14, wherein the device further comprises a first cable and a second cable attached to the lever member, wherein:
   the first cable comprises a first end and a second end, wherein the first end terminates at the connection with the lever member and the second end terminates in a handle; and
   the second cable comprises a cable guide and a cable path with a first end and a second end around a housing of the gate valve assembly, wherein:
      the first end of the cable path terminates in a cable stop and a tension spring, and
      the second end of the cable path terminates in a handle; and
   actuating the gate valve by pulling the handle of the first cable attached to the lever member to open the gate valve and pulling the handle of the second cable attached to the lever member to close the gate valve.

19. The method of claim 14, further comprising releasably locking the shaft by rotating a cam with a protrusion, wherein the cam is attached to the support plate and wherein rotating the cam directs the protrusion towards an aperture in the linear sleeve; and wherein the shaft comprises a notch adapted to receive the protrusion through the aperture when the gate valve is in a closed position.

20. The method of claim 19, wherein the method further comprises actuating the lever member from an open position to a closed position, drawing the shaft and valve stem assembly from its open position to its closed position, wherein the shaft pushes the protrusion out of the at least one aperture of the linear sleeve by rotating the cam as the shaft travels from its open position, and, when the shaft reaches its closed position, allowing a torsion spring of the cam to force the protrusion through the at least one aperture of the linear sleeve into the at least one notch of the shaft.

* * * * *